United States Patent [19]

Minnick et al.

[11] 3,854,968

[45] Dec. 17, 1974

[54] LIME-FLY ASH CEMENTITIOUS MIXTURE WITH IMPROVED HARDENING AND EXPANSION CHARACTERISTICS

[75] Inventors: Leonard John Minnick, Cheltenham; William C. Webster, Warminster; Charles L. Smith, Conshohocken, all of Pa.

[73] Assignee: I U Conversion Systems, Inc., Philadelphia, Pa.

[22] Filed: Feb. 15, 1972

[21] Appl. No.: 226,506

Related U.S. Application Data

[62] Division of Ser. No. 42,024, June 1, 1970, abandoned.

[52] U.S. Cl............. 106/109, 106/118, 106/DIG. 1
[51] Int. Cl. ........................ C04b 11/00, C04b 7/12
[58] Field of Search................ 106/109, 118, DIG. 1

[56] References Cited
UNITED STATES PATENTS

| | | | |
|---|---|---|---|
| 460,697 | 10/1891 | Wright................................ | 106/118 |
| 1,033,984 | 7/1912 | Brown................................. | 106/109 |
| 1,604,574 | 10/1926 | Holmes............................... | 106/118 |
| 1,834,799 | 12/1931 | Nickel................................. | 106/109 |
| 2,241,604 | 5/1941 | Knibbs et al....................... | 106/118 |
| 2,564,690 | 8/1951 | Havelin et al...................... | 106/118 |
| 3,565,648 | 2/1971 | Mori et al........................... | 106/89 |
| 3,785,840 | 1/1974 | Minnick et al..................... | 106/118 |

OTHER PUBLICATIONS

Davidson et al., "Activation of Fly-Ash Lime Reaction by Trace Minerals," Hiway Research BRD Bull. No. 231, pp. 67–81, 1959.

Primary Examiner—J. Poer
Assistant Examiner—James W. Hellwege
Attorney, Agent, or Firm—Miller, Frailey & Prestia

[57] ABSTRACT

Cementitious mixture comprised of fly ash and lime-sulfate material, as contrasted with lime as used in conventional mixtures, hardens more rapidly and has improved characteristics with respect to dimensional stability. Preferably, the lime-sulfate material is made by the addition of sulfuric acid solution to quicklime in a modified lime hydration process. Alternatively, the lime-sulfate material may comprise lime and a separate sulfate compound such as gypsum. The cementitious mixture of this invention may be used, alone or in conjunction with filler material, as a subsurface base material or as a soil stabilization agent. It may also find use as a land fill or in making pre-stressed structural members.

4 Claims, 8 Drawing Figures

LIME–FLY ASH–GYPSUM SYSTEM

INVENTORS.
L. JOHN MINNICK
WILLIAM C. WEBSTER
CHARLES L. SMITH

BY Paul & Paul
ATTORNEYS.

7 DAY COMPRESSIVE STRENGTH OF MIXTURE:
28% Composition Above 72% Siliceous Sand Aggregate 28 DAY COMPRESSIVE STRENGTH OF MIXTURE:
28% Composition Above 72% Siliceous Sand Aggregate

INVENTORS.
L. JOHN MINNICK
WILLIAM C. WEBSTER
CHARLES L. SMITH

BY Paul & Paul
ATTORNEYS.

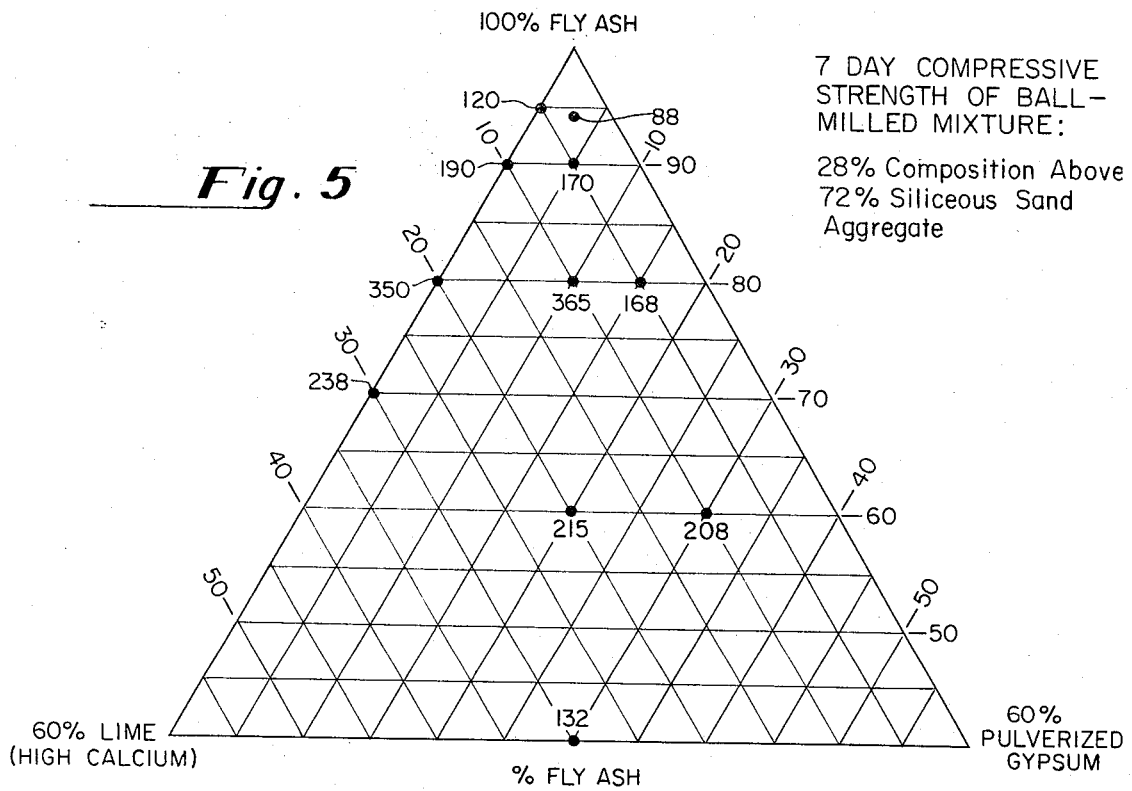

LIME-FLY ASH CEMENTITIOUS MIXTURE WITH IMPROVED HARDENING AND EXPANSION CHARACTERISTICS

This application is a division of application Ser. No. 42,024 filed June 1, 1970, now abandoned.

The present invention relates to a modified lime-fly ash cementitious mixture, to specific lime-sulfate materials used in such mixtures and to a process for making such lime-sulfate materials. These mixtures may be used by themselves or in conjunction with filler material, such as aggregate, for various purposes wherein structural integrity, land fill or support is desired.

The term "fly ash" as used in the present specification is intended, except as noted below, to indicate the finely divided ash residue produced by the combustion of pulverized coal, which ash is carried off with the gases exhausted from the furnace in which the coal is burned and which is collected from these gases usually by means of suitable precipitation apparatus such as electrical precipitators. Those finely pulverized ashes resulting from combustion of oil and from combustion of waste materials in a large incinerator can also be utilized in the methods described herein provided their chemical compositions are reasonably similar to pulverized coal fly ashes. The fly ash so obtained is in a finely divided state such that usually at least 70% by weight passes through a 200-mesh sieve, although incinerator ashes may be considerably coarser. Fly ash may be considered an "artificial pozzolan," as distinguished from "natural pozzolans," which are ordinarily of volcanic origin. The pozzolans generally are known to react slowly with alkaline earth oxides and moisture, ultimately setting up into a hard rock-like material. This is the basis for lime-fly ash cementitious mixtures.

As used throughout this specification, the term "lime," unless more specifically identified, indicates quicklime, hydrated lime, or slaked lime of either the dolomitic or high calcium variety. The term "hydrated lime" indicates a dry powder obtained by treating quicklime with sufficient water to satisfy its chemical affinity for water under the conditions of its hydration. It consists essentially of calcium hydroxide or a mixture of calcium hydroxide in conjunction with magnesium oxide and/or magnesium hydroxide. In the above definition "quicklime" is used to indicate a calcined material, the major portion of which is calcium oxide or calcium oxide in conjunction with lesser amounts of magnesium oxide, capable of slaking with water. The term "slaked lime" is used interchangeably with "hydrated lime." Both "hydrated lime" and "slaked lime" may be associated with excess water resulting in a moist or slurried state or condition.

Gypsum or pulverized gypsum as used herein refers to particulate synthetic or naturally occurring hydrated calcium sulfate, having two moles of water chemically attached er mole calcium sulfate, preferably, for reactivity purposes, with at least 70 percent finer than a wet 200-mesh sieve.

The term "aggregate," as used herein, refers to natural or artificial inorganic materials most of which are substantially chemically inert, with respect to fly ash and lime, and substantially insoluble in water. Typically, aggregate may comprise limestone, sand, blast furnace slag, gravel, synthetic aggregates and other similar material.

A number of patents have been issued with respect to lime-fly ash cementitious mixtures. U.S. Pat. No. 2,564,690 relates to lime-fly ash-fine aggregate cements; U.S. Pat. No. 2,698,252 relates to lime-fly ash compositions for stabilizing finely divided materials; U.S. Pat. No. 2,815,294 refers to lime-fly ash-aggregate compositions for stabilizing certain soils; U.S. Pat. No. 3,076,717 deals with lime-pozzolan-aggregate load supporting compositions; U.S. Pat. No. 3,230,103 deals with non-plastic compositions containing pozzolan, lime and blast furnace slags; and U.S. Pat. No. 2,942,993 deals with a method for accelerating the setting rate of lime-fly ash soil mixtures.

The primary difficulty with these materials as noted in the aforementioned patents is concerned with the rather slow rate of hardening which is characteristic of these compositions. Directly associated with this situation are problems related to durability under alternate cycles of wetting and drying or freezing and thawing.

A further difficulty with materials heretofore known relates to long term dimensional stability. In some situations where relatively high lime-fly ash contents are required in order to obtain the early hardening characteristics that are necessary for particular applications, the excessive quantities of reactive materials may subsequently result in expansive forces which can and do result in problems, such as upheavals in the road surface laid over the lime-fly ash cementitious sub-surface. The expansion which is characteristic of prior art material occurs over an extended period of time with evidence of a problem often not being apparent for several years.

It is therefore an object of this invention to provide a novel particulate material, and a process for making same, which has specific application in the cementitious mixture of the present invention.

It is a further object of the present invention to provide a lime-fly ash cementitious mixture which hardens more quickly than prior art mixtures.

Another object of this invention is to provide a lime-fly ash cementitious mixture the expansion of which due to the cementitious reaction occurs more quickly than prior art mixtures.

Still another object of this invention is to provide improved methods of applying hardenable materials to base surfaces to produce land fill, runway and highway sub-surfaces, etc.

Briefly, these and other objects are met by cementitious mixtures comprised of fly ash and, in place of lime as used heretofore, a lime-sulfate material. This lime-sulfate material may be comprised of a novel particulate material, as taught herein, which is comprised of hydrated lime and calcium or calcium and magnesium sulfates produced, in accordance with the present invention, by the reaction of quicklime with sulfuric acid solution. Alternatively, the lime-sulfate material may comprise lime and a separate sulfate compound such as gypsum.

The cementitious mixture of the present invention may be used in forming expansive or non-contracting cements. It may also be used in forming pre-stressed structural members. Further, it may be admixed with soil, aggregate or other filler material and may be applied to a surface, in admixture with such materials or be admixed thereon, to stabilize soils or to form a sub-surface base for highways, runways, etc. Depending on the application the mixture may be compacted prior to hardening.

The cementitious mixture of the present invention is compatible with other conventional cementitious systems and mixtures of the present invention may incorporate other hydraulic cements, pulverized slag, etc., and additives commonly used with these materials such as water reducing agents, accelerators and the like.

For a better understanding of this invention, reference is made to the following detailed description, taken in conjunction with the accompanying drawings, in which:

FIGS. 3-8 are graphs showing the hardening and/or expansion characteristics of cementitious mixtures described in several specific examples herein.

Figure 1:
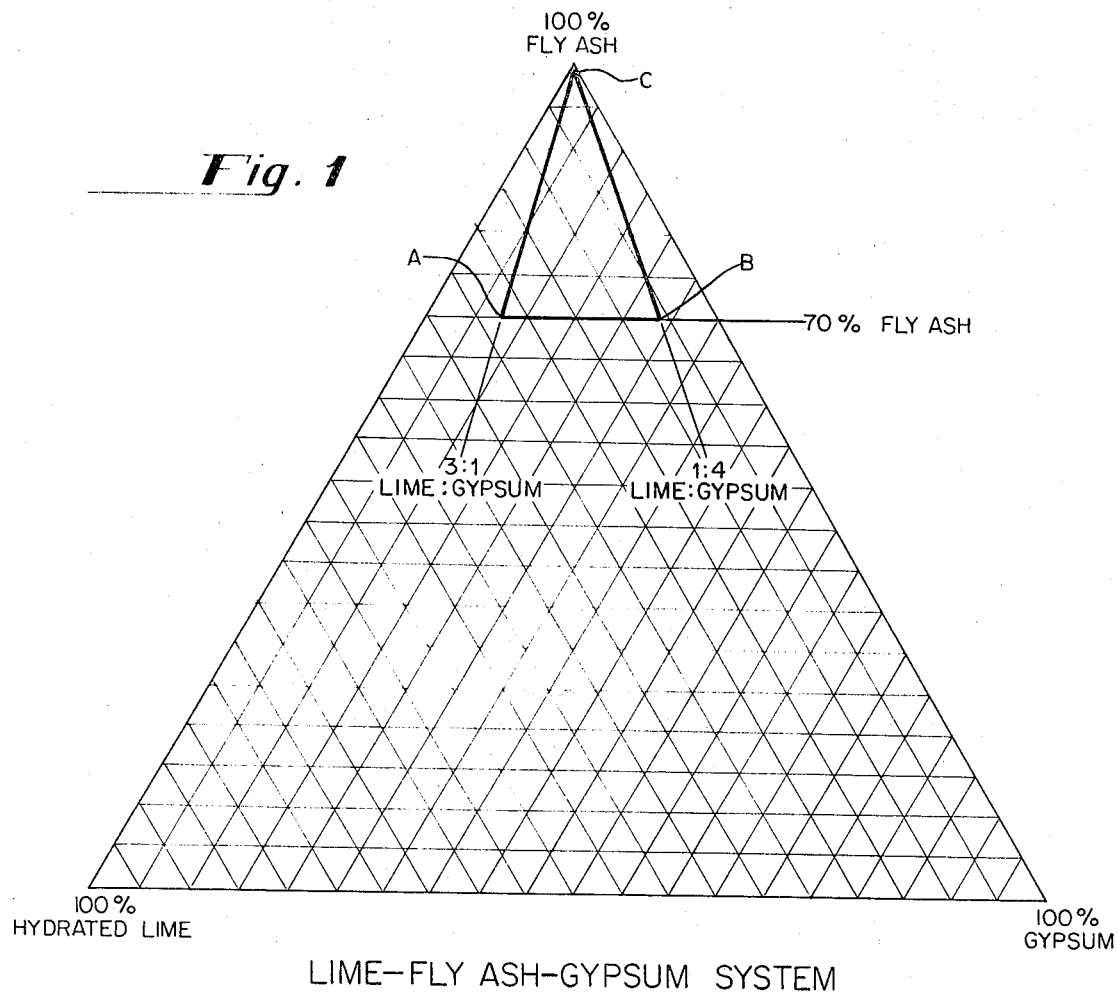
FIG. 1 is a three component composition diagram of the lime-gypsum-fly ash system.

Referring more specifically to FIG. 1, there is shown a composition diagram of one system within the scope of this invention, namely the lime-gypsum-fly ash system wherein the preferred cementitious mixture of the present invention falls in the area bound by the lines connecting points A, B, and C. It will be noted that this preferred mixture in all cases is comprised of at least 70% fly ash and lime and gypsum totaling at least 1%, by weight. Further it will be noted that the weight ratio of lime to gypsum is limited to the range of 3:1 to 1:4.

Mixtures with less than 70% fly ash may also be used but costs of the other reactants as well as the obvious necessity for some minimum amount of the reactants provided by the fly ash much be considered. It is on this basis that the 70% minimum is established Mixtures of fly ash with either the novel lime-sulfate hydrate of the present invention or other lime-sulfate material may be further activated, such as by ball milling or high energy blending with the fly ash, in accordance with the copending application of Webster and Smith entitled "HIGHLY ACTIVATED MIXTURES FOR CONSTRUCTING LOAD-BEARING SURFACES AND METHOD FOR MAKING SAME," Ser. No. 23,887, filed Mar. 30, 1970, and of common assignment herewith.

In the cementitious mixture of the present invention, lime-sulfate reacts with portions of the fly ash to form sulfo-aluminates hydrates. These reaction products are generally of the variety $3CaO.Al_2O_3.3CaSO_4.30—32-H_2O$ or $3CaO.Al_2O_3.CaSO_4.12—13H_2O$, although $Fe_2O_3$ can replace $Al_2O_3$ and $MgSO_4$ can replace $CaSO_4$ either partially or completely. These products are formed during the early stages of the reaction and are largely responsible for the strength of the fly ash, lime-sulfate material mixture during the early stages of the hardening process. Inasmuch as only very limited quantities of sulfates (generally calcium, sodium and/or potassium sulfate) are ordinarily present in common varieties of fly ash, the quantiy of sulfo-aluminate hydrates formed in prior art mixtures is rather small. Considerable quantities of calcium hydroxide (from the lime) and of $Al^{+++}$ (from the fly ash) are available and can react with the supplemental sulfate ions which are provided in the present invention.

The cementitious compositions made in accordance with this invention appear to be free of many of the difficulties experienced with previous materials. These materials can be used in specific applications in which the previous materials would not perform satisfactorily. For example, ordinarily, lime-fly ash cements with fine aggregate as filler material are somewhat lower in compressive strength than lime-fly ash cements generally. In contrast, cementitious mixtures of the present invention with fine aggregate have appreciably better compressive strength properties than prior art lime-fly ash cements with fine aggregate filler. Also, compositions with characteristics of physical performance which are essentially equivalent to the previous materials can be made with significant reductions in the quantity of lime product or lime product and fly ash required in the compositions.

A further problem which has sometimes been experienced with previous materials has been shrinkage of the cementitious mixture when it has been placed in large flat areas which contain no provision for expansion or contraction. Shrinkage normally occurs during a period of months after placement of the material and is believed to be associated primarily with the loss of part of the moisture which is used in placing the composition. This problem is largely offset with the present invention because of the relatively large amount of water of hydration retained in the sulfo-aluminate hydrates formed upon hardening of the mixtures of the present invention. Further, these mixtures tend to expand more quickly than prior art mixtures. This expansion therefore tends to offset any shrinkage which occurs coincidently therewith.

In some cases this early expansion characteristic may be used in expansive cement applications, the preferred way being to utilize the present invention mixture as additives to portland or portland-type cements. These cements, generally referred to herein as hydraulic cements, consist essentially of anhydrous calcium silicates, anhydrous calcium aluminates or aluminosilicates, or a combination of the two, which will harden in the presence of moisture and which may contain fly ash and other pozzolans, blast furnace slag and the like. These modified cements may then be used, for example, in pre-stressed structural members, pipe or in shrinkage compensated concretes for large slabs or water-tight structures.

The sulfate compound in the lime-sulfate material used in the present invention may be supplied in any of numerous forms. One lime-sulfate material which is particularly useful is a novel sulfated-hydrated lime particulate material produced in accordance with the present invention. If lime and a separate sulfate compound are used, the sulfate must generally be in a relatively soluble form for purposes of reactivity. Gypsum, as mentioned above, anhydrous calcium sulfate, and plaster of paris are typical sources of sulfate ions which may be used in this manner.

Figure 2:
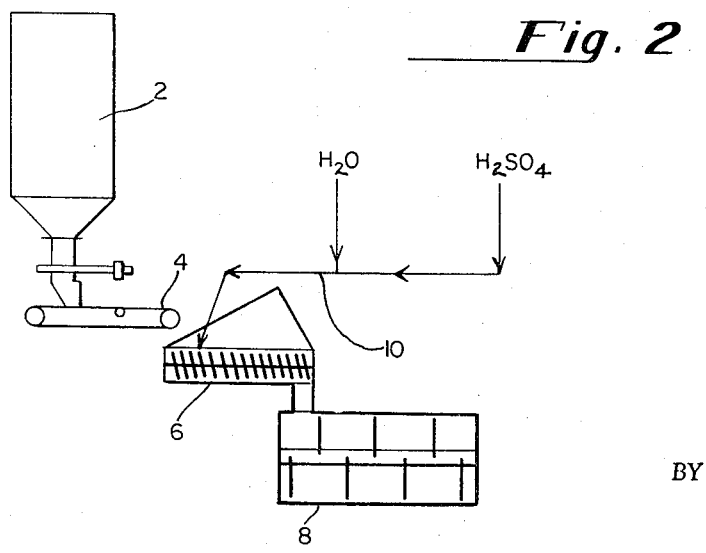
FIG. 2 is a schematic diagram of a process for producing a novel lime-sulfate material in accordance with the present invention.

The novel lime sulfate material of this invention produced in a process illustrated schematically in FIG. 2. is made by the reaction of sulfuric acid solution with quicklime. As seen in FIG. 2, this process resembles an ordinary hydration process wherein sulfuric acid solution is added to and reacted with the quicklime, said quicklime being either high calcium (CaO) or (dolomitic(CaO + MgO).

Referring more specifically to FIG. 2, there is shown a quicklime feed tank 2, a weigh feeder 4 at the outlet thereof, feeding quicklime through a pug mill 6, where the sulfuric acid solution is added through line 10 and crudely mixed with the quicklime to a hydration reaction tank 8, wherein some of the quicklime is hydrated and some reacts with the $H_2SO_4$ to form calcium or calcium and magnesium sulfates. The product is a particulate material comprised of finely dispersed and intimately combined hydrated lime and calcium or calcium and magnesium sulfates.

In the foregoing process, the water and sulfuric acid need not be added in a combined form such as in a solution of sulfuric acid, although this is probably the most practical way to add both the acid and the water. Generally, the amount of water added is that sufficient to hydrate the portion of the quicklime which will not be converted to sulfates. An excess of water is avoided, as in a conventional hydration process, since excess water must be evaporated by the exothermic heat in the reaction to yield an essentially dry product. The molar ratio of quicklime to sulfuric acid in the reaction may be varied in accordance with the desired molar ratio of high calcium hydrate or dolomitic monohydrate to calcium or calcium and magnesium sulfates in the product. For example, if this desired ratio is 2.5:1, a 62.2% solution (50°Baume) of $H_2SO_4$ may be used to provide the proper quantities of both $H_2SO_4$ and water. Where this sulfated hydrated quicklime product is to be used in the cementitious mixture of the present invention, this mole ratio more specifically the mole ratio of total calcium hydroxide and magnesium oxide to total calcium and magnesium sulfate, should be more than 1:3.3.

In order to discern the compositional limits of fly ash, lime and sulfate material, wherein the sulfate is contributed by sulfate sources other than gypsum, or the sulfated-hydrated lime of this invention, the minimum concentration of the sulfate source must be determined by reference to the weight of the sulfate source corresponding to the molar equivalent amount of gypsum.

Because the calcium ion in gypsum or other calcium sulfates contributes to the formation of the sulfoaluminate hydrate in the cementitious mixture of the present invention, additional lime is required in those mixtures in which the source is something other than calcium sulfates. Many factors such as component particle size, solubility and impurities will have an effect on the rate of reaction and should be recognized. When ionic ratios are considered in these mixtures, the weight ratio of lime to sulfate is in the range: $(3 + ab) : a$ to $(1 + 4ab) : 4a$, where $a = 172$/Molecular weight of the non-gypsum sulfate source and $b = 74$/Molecular weight of the non-gypsum sulfate source When calcium sulfates other than gypsum are used, their weights are converted to the corresponding molar equivalents of gypsum. The weight ratio of lime to these sulfates is in the following range:

$3:a$ to $1:4a$ where $a$ is defined as above.

Regardless of the source of the sulfate in the lime sulfate material, the total lime pulse sulfate (with non-gypsum sulfate sources calculated as the weight of an equimolar amount of gypsum) must be at least 1%, by weight of the total fly ash, lime and sulfate compound.

The cementitious mixtures of the present invention may be used, for example, to produce pre-stressed structural members, (as mentioned above), or, when applied to a surface, to act as land fill, or as a soil stabilization agent or a sub-surface for highways and runways.

When used for soil stabilization, the cementitious mixture is admixed, either with or without filler material, to the soil to be stabilized, which soil is broken up for purposes of the admixture. The combination is then compacted.

In applying the cementitious mixture of the present invention to a base surface to produce land fill or a sub-surface for a highway or runway, the base surface is covered with the mixture, which may or may not be subsequently compacted and which may or may not be admixed with a filler material such as soil and/or aggregate.

As mentioned above, the cementitious mixture of the present invention is particularly useful in producing accelerated hardening mixtures with fine aggregate, which admixtures are excellent for highway and runway sub-surface application. In these applications, a mix comprised of 5–30%, by weight, fly ash, 67–94.5%, by weight, aggregate, and 0.5–3.0%, by weight, lime-sulfate material is preferred. Most preferred is such a mix wherein the gradation of the aggregate is within the following range:

| | |
|---|---|
| Through 3 inch sieve | 100% |
| Through 1½ inch sieve | 90–100% |
| Through ¾ inch sieve | 70–100% |
| Through ⅜ inch sieve | 50–100% |
| Through No. 4 mesh sieve | 30–100% |
| Through No. 60 mesh sieve | 0–50% |
| Through No. 100 mesh sieve | 0–40% | and has a fineness modulus (as defined in Dictionary of Mining, Mineral and Related Terms-U.S. Dept. of Interior, 1968) of 1.76–6.01.

Water is generally necessary for the cementitious reaction in the mixtures of the present invention, both to contribute water of hydration and to provide a soluble reaction media. Available water from natural sources, such as ground water, may be relied upon in some application of the cementitious mixtures of the present invention, in which cases the mixtures may be applied dry. Generally, to speed up the cementitious reaction, some water is added to the mixture, which is then applied in wet form. The consistency of the mixture may vary therefore from damp, non-plastic and non-pourable to, in some extreme cases, plastic and pourable.

Following are several specific examples of the cementitious mixture of the present invention and of the method of producing and using the materials of this invention.

EXAMPLE 1

A series of mixtures was prepared containing dolomitic monohydrated lime, pulverized gypsum, bituminous fly ash, and dolomitic aggregate. The aggregate (ordinary commercial grade) used had the following approximate gradation:

| | | |
|---|---|---|
| % thru ¾" | Sieve | 90 |
| % thru ⅜" | Sieve | 60 |
| % thru 4 | Mesh Sieve | 42 |
| % thru 8 | Mesh Sieve | 32 |
| % thru 30 | Mesh Sieve | 16 |
| % thru 50 | Mesh Sieve | 10 |
| % thru 100 | Mesh Sieve | 8 |
| Fineness Modulus in Dictionary of Mining, Mineral and | | 5.2 (As defined |

-Continued
Related terms — U.S. Department of Interior, 1968).

A reference mix containing 3% of the hydrated lime was compared with mixes containing 1% lime with varying percentages of pulverized gypsum. In each case 87% by weight of aggregate was used in the mixtures. Cylinders (4 inch diameter × 4.5 inch length) of the compositions were molded and each was placed in a sealed container. These containers were then placed in an oven and cured at 100°F. After 7 days curing the cylinders were removed, saturated with water and tested for unconfined compressive strength. The results that were obtained are listed in the following table:

| % Lime | % Gypsum | % Fly Ash | % Aggregate | Compressive Strength* |
|---|---|---|---|---|
| 1.0 | 0 | 12.0 | 87.0 | 606** |
| 1.0 | 0.5 | 11.5 | 87.0 | 723** |
| 1.0 | 1.0 | 11.0 | 87.0 | 495 |
| 3.0 | 0 | 10.0 | 87.0 | 778** |

*lbs. per sq. in., 7 days of curing at 100°F
** ave. of 2 separate tests (595 and 617; 719 and 727; 734 and 823)

These results show that relatively high compressive strength was obtained at relatively low lime concentrations.

EXAMPLE 2

A series of mixtures was prepared essentially as outlined in Example 1, except that different samples of dolomitic monohydrated lime, pulverized gypsum and fly ash were used, and 84% of a combined aggregate was used. This aggregate is a mixture of siliceous gravel and fine dolomite and has the following approximate gradation:

| % thru ¾" | Sieve | 99 |
|---|---|---|
| % thru ⅜" | Sieve | 97 |
| % thru 4 | Mesh Sieve | 96 |
| % thru 8 | Mesh Sieve | 92 |
| % thru 30 | Mesh Sieve | 62 |
| % thru 50 | Mesh Sieve | 46 |
| % thru 100 | Mesh Sieve | 33 |
| Fineness Modulus | | 1.9 |

The results obtained on cylinders cured for 7 days as outlined in Example 1 are given in the following table:

| % Lime | % Gypsum | % Fly Ash | % Aggregate | Compressive Strength* |
|---|---|---|---|---|
| 1.0 | 0 | 15.0 | 84.0 | 372 |
| 1.0 | 0.5 | 14.5 | 84.0 | 540 |
| 1.0 | 2.0 | 13.0 | 84.0 | 401 |
| 3.0 | 0 | 13.0 | 84.0 | 415** |

*lbs. per sq. in., 7 days of curing at 100°F
**ave. of 2 separate tests (391 and 438)

Here again, relatively high compressive strength at low lime concentrations is shown, notwithstanding the use of fine aggregate which ordinarily keeps the compressive strength of lime-fly ash cements low.

EXAMPLE 3

Using different samples of the same materials discussed in Example 1, and using the same mixing and curing procedures, the following results were obtained after 7 and 28 days of curing:

| % Lime | % Gypsum | % Fly Ash | % Aggregate | Compressive Strength | |
|---|---|---|---|---|---|
| | | | | 7 day | 28 day |
| 0.75 | 0.75 | 11.5 | 87.0 | 535 | 892 |
| 1.0 | 1.0 | 11.0 | 87.0 | 423 | — |
| 1.5 | 1.5 | 10.0 | 87.0 | 348 | — |
| 2.0 | 2.0 | 9.0 | 87.0 | 327 | 1612 |
| 3.0 | 0 | 10.0 | 87.0 | 745 | 2053 |

*lbs. per sq. inch, curing at 100°F

The early compressive strength of low lime content mixtures should again be noted.

EXAMPLE 4

Using dolomitic monohydrated lime, pulverized gypsum, bituminous fly ash and a fine siliceous dredge sand, mixtures were made and cured as outlined in Example 1. The approximate screen analysis of the aggregate used is as follows:

| % thru ¾" | Sieve | 99 |
|---|---|---|
| % thru ⅜" | Sieve | 94 |
| % thru 4 | Mesh Sieve | 84 |
| % thru 16 | Mesh Sieve | 53 |
| % thru 100 | Mesh Sieve | 2 |
| Fineness Modulus (approximately) | | 3.4 |

The results which were obtained on these mixtures are presented in the following table:

| % Lime | % Gypsum | % Fly Ash | % Aggregate | Compressive Strengths* |
|---|---|---|---|---|
| 1.0 | 0.75 | 16.25 | 82.0 | 638 |
| 3.0 | 0 | 12.0 | 85.0 | 313 |
| 3.0 | 0 | 14.0 | 83.0 | 261 |
| 5.0 | 0 | 13.0 | 82.0 | 568 |

*lbs. per sq. inch, 7 days of curing at 100°F

These results also demonstrate the early hardening and superior strength characteristics of the cementitious mixtures of the present invention, particularly with a fine aggregate filler material.

EXAMPLE 5

A series of mixtures was prepared containing high calcium hydrated lime, pulverized gypsum, bituminous fly ash and a graded silica sand (i.e. another fine aggregate filler material). The silica sand had the following approximate sieve analysis:

| % thru 30 Mesh Sieve | 100 |
|---|---|
| % thru 50 Mesh Sieve | 20 |

| -Continued | |
|---|---|
| % thru 100 Mesh Sieve | 3 |
| Fineness Modulus | 1.8 |

These materials were combined with water in a laboratory Hobart type mixer and small cylinders having a cross sectional area of 1 square inch were compressed from the damp mix in a laboratory Carver press. These cylinders were cured in closed containers at 100°F for the indicated periods of time, and were tested for unconfined compressive strengths.

Figure 3:
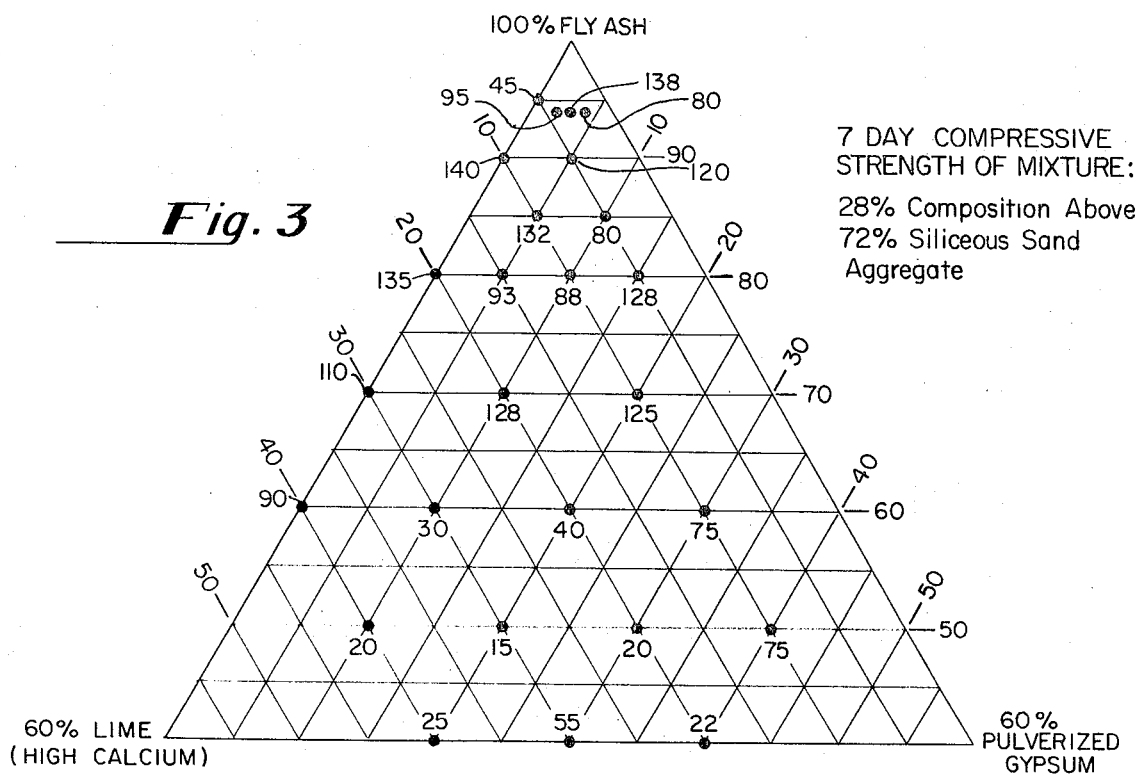
Figure 4:
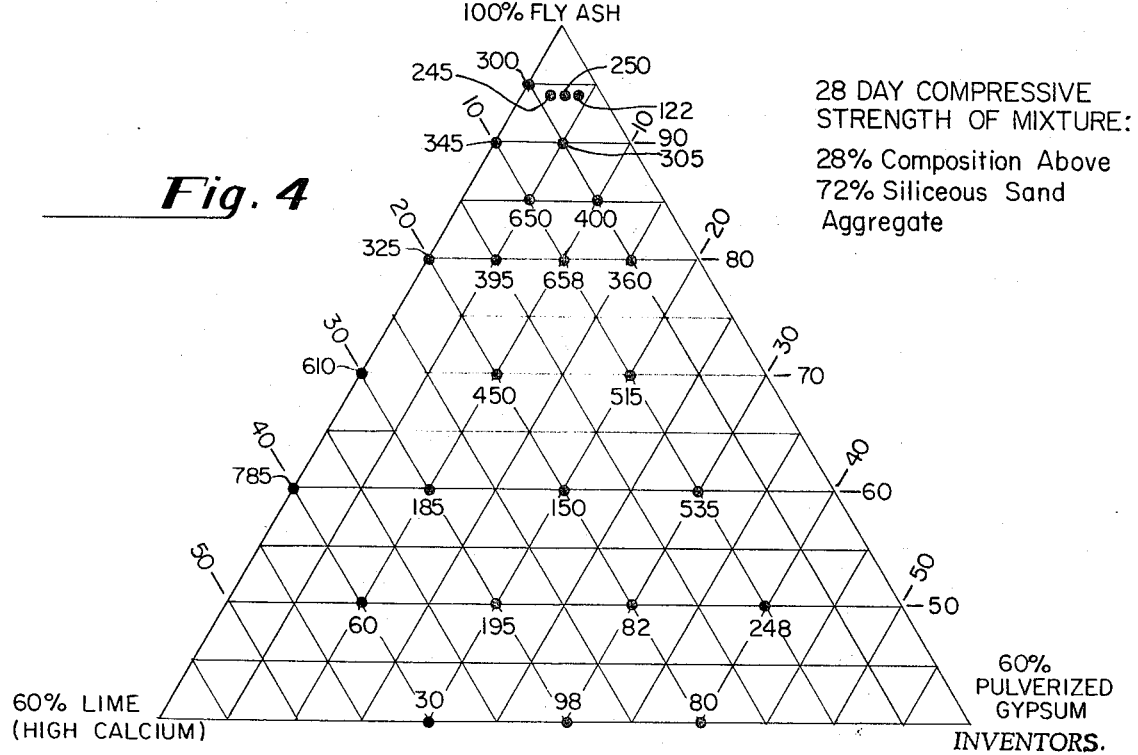

The results obtained at 7 and 28 days are presented in FIGS. 3 and 4 wherein FIG. 3 is a triangular diagram of the fly ash-high calcium lime-gypsum system, having marked thereon the seven day compressive strength of samples at various compositional points on the system diagram; FIG. 4 is similar to FIG. 3 except that the compressive strengths shown are the 28 day compressive strengths of the same compositions shown in FIG. 3. In all cases the strengths are based on a mixture of 28%, by weight, of cementitious mixture and 72%, by weight, of siliceous sand aggregate. The percentages on the diagrams in FIGS. 3 and 4 do not include aggregate.

Note that because of the different testing method, the results in this Example, and others in which the same testing method is used, are not directly comparable to those based on different testing methods.

From FIGS. 3 and 4, it can be seen that at 7 days, the optimum lime content with no gypsum is about 10-20%. In contrast, comparable 7 day strength is attained with a 3% lime, 3% gypsum mixture.

EXAMPLE 6

A series of mixtures was prepared as in Example 5, using the same materials as used in Example 5, wherein the dry mixed materials were activated by ball milling for 30 minutes in a laboratory batch mill. Test results, reported as in Example 5, based upon testing as in Example 5 and comparable to those in Example 5 are shown in FIGS. 5 and 6.

EXAMPLE 7

Using dolomitic monohydrated lime, pulverized gypsum and bituminous fly ash, 1 inch by 1 inch by 11 inch bars were prepared. The materials were mixed to a damp consistency in a laboratory Hobart mixer, after which the damp mixture was hand-compacted into standard bar molds. The molds containing the specimens were cured for 7 days in a moist closet (a chamber held at 73.4° ±3°F and 90% relative humidity), after which they were stripped, and initial length measurements were made on the bars. The bars were returned to the moist closet for continued moist curing and subsequent readings were taken at 7 day intervals. The proportions of the materials which were used in the bars are as follows:

| Mix No. | Parts Lime | Parts Fly Ash | Parts Pulverized Gypsum |
|---|---|---|---|
| 1 | 0.5 | 11.5 | 0.5 |
| 2 | 4.0 | 8.5 | 0 |

Figure 7:
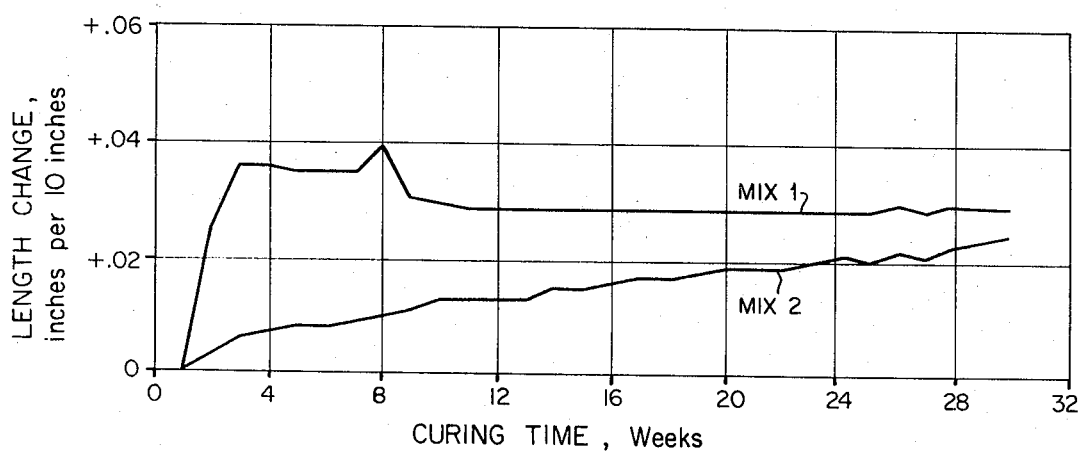

These proportions correspond approximately to the cementitious portion of the compositions discussed in Examples 1 through 6. The change in length of the bars is shown in FIG. 7, wherein it will be seen that Mix 1, including gypsum, undergoes its expansion relatively quickly and then stabilizes in length at 8-12 weeks of curing time. Mix 2, which includes no gypsum and therefore corresponds to prior art materials, expands gradually throughout the 30 week curing period. Note that the nature of this test is such that shrinkage is prevented by maintaining the samples in a moisture closet. Thus the shrinkage which would ordinarily occur due to loss of water from the mixtures early in the curing cycle does not enter into the dimensional changes observed.

EXAMPLE 8

Additional lime, gypsum, and fly ash bars were made using the same materials and procedures discussed in Example 7. The proportions of materials which were used were as follows:

| Mix No. | Parts Lime | Parts Fly Ash | Parts Pulverized Gypsum |
|---|---|---|---|
| 3 | 1.0 | 10.5 | 1.0 |
| 4 | 2.0 | 8.5 | 2.0 |

Figure 8:
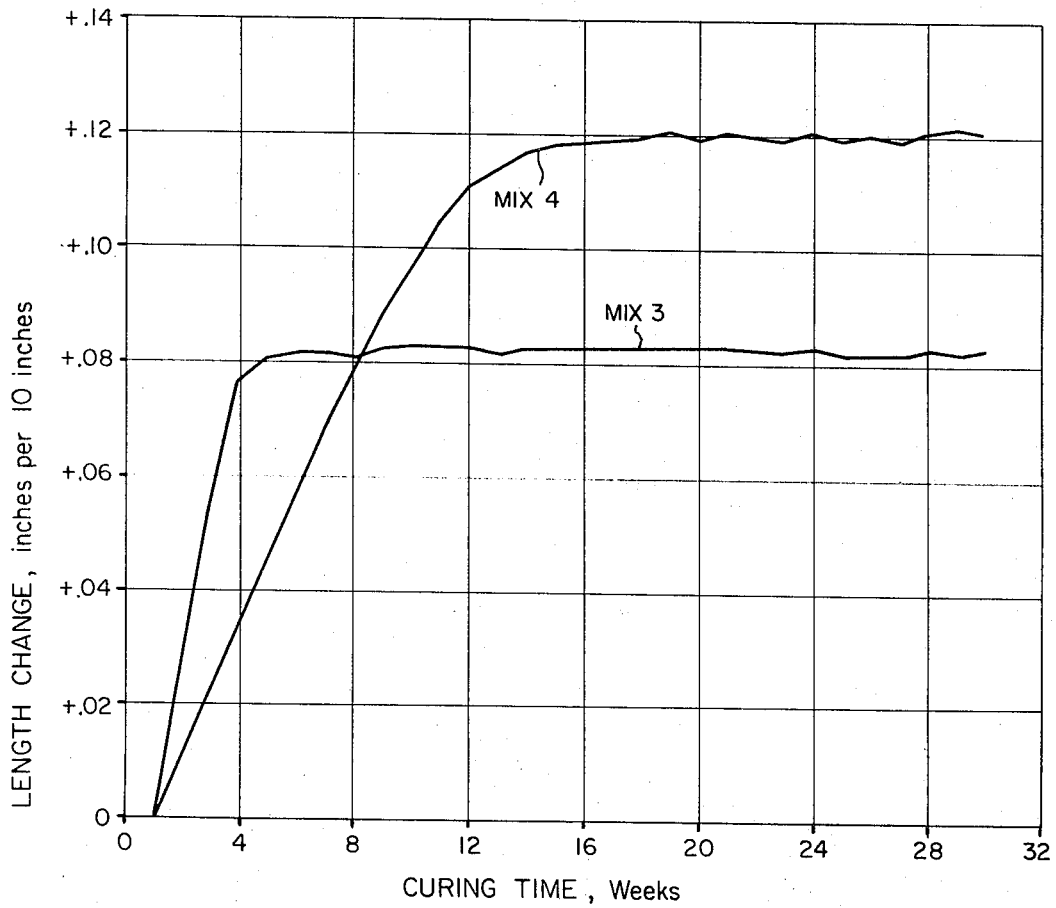

The change in length of these bars is shown in FIG. 8, wherein the mixes of the present invention are again shown to undergo relatively rapid expansion and then stabilize in length.

EXAMPLE 9

Using high calcium hydrated lime, a dry calcium sulfate waste product (by product of hydrofluoric acid production), and a pond ash (combination of fly ash and bottom ash), mixtures were prepared in a laboratory Hobart mixer. Mixtures were prepared at two consistencies: either damp (using the moisture content in the pond ash) or pourable (additional moisture added). The mixes were then placed in segments of stainless steel tubing, 2 inches in diameter and 6 inches long. The tubes were capped at the bottom end with nylon cloth, held in place by rubber bands, and the filled test assemblies were placed in a container. The bottoms of the tubes were surrounded by damp sand. At varying intervals, as indicated in the following table, these specimens were tested for resistance to penetration (determined as resistance in pounds per square inch required for penetration of 1 inch into the specimen by a 0.025 square inch rod). The pond ash used has a moisture content of about 30% and the following sieve analysis:

| % thru ¾" | Sieve | 100.0 |
|---|---|---|
| % thru 4 | Mesh Sieve | 96.4 |
| % thru 30 | Mesh Sieve | 95.5 |
| % thru 100 | Mesh Sieve | 88.2 |
| % thru 200 | Mesh Sieve | 70.2 |
| % thru 325 | Mesh Sieve | 57.8 |

| % Hi Calcium Lime* | %Dry Sulfate Waste Product* | Penetration Resistance | | |
|---|---|---|---|---|
| | | 1 week | 2 weeks | 4 weeks |
| WET (POURABLE CONSISTENCY) | | | | |
| 1.0 | 2.0 | 400 | 600 | 800 |
| 1.5 | 1.0 | 400 | 1600 | 1000 |
| 1.5 | 1.5 | 0 | 1600 | 1400 |

-Continued

| % Hi Calcium Lime* | %Dry Sulfate Waste Product* | Penetration Resistance | | |
|---|---|---|---|---|
| | | 1 week | 2 weeks | 4 weeks |
| WET (POURABLE CONSISTENCY) | | | | |
| 3.0 | 3.0 | 600 | 2000 | 3000 |
| 4.5 | 4.5 | 600 | 1800 | 5600 |
| 4.5 | 6.0 | 520 | 2200 | 7600 |
| DAMP CONSISTENCY | | | | |
| 1.0 | 2.0 | 0** | 0** | 0** |
| 1.5 | 1.0 | 0** | 0** | 360** |
| 1.5 | 1.5 | 0** | 280** | 320** |
| 3.0 | 3.0 | 400** | 2400** | 3400** |
| 4.5 | 4.5 | 0** | 1100** | 2600** |
| 4.5 | 6.0 | 0** | 820** | 2000** |

*Added as % of dry weight of pond ash used.
**Average of two readings

EXAMPLE 10

Mixtures were prepared as in Example 9 except that the source of sulfate for this series of tests was a synthetic insoluble calcium sulfate anhydrite, prepared by calcining pulverized rock gypsum at 1,000°F for 8 hours. Curing of specimens was accomplished in three differing ways: Over damp sand (as in Example 9), in 1 inch of water at ambient temperatures, or in 1 inch of water at 50°F. The results of these tests are presented in the following table:

| % Hi Calcium Lime | % Insoluble Anhydrite | Penetration Resistance | | | |
|---|---|---|---|---|---|
| | | 1 week | 2 weeks | 4 weeks | 8 weeks |
| Over Damp Sand | | | | | |
| 0.25 | 0.25 | 0 | 0 | 0 | 480 |
| 0.50 | 0.50 | 400 | 480 | 480 | 720 |
| 1.00 | 1.00 | 1640 | 1800 | 1800 | 2200 |
| 1.50 | 1.50 | 1600 | 2000 | 1840 | 2400 |
| 1.50 | 2.00 | 2400 | 2000 | 3000 | 2600 |
| In 1" of Water (70°F) | | | | | |
| 0.25 | 0.25 | 0 | 0 | 0 | 0 |
| 0.50 | 0.50 | 800 | 840 | 600 | 800 |
| 1.00 | 1.00 | 1280 | 1240 | 840 | 1200 |
| 1.50 | 1.50 | 2000 | 2800 | 2600 | 2800 |
| 1.50 | 2.00 | 2080 | 2600 | 2600 | 2600 |
| In 1" of Water (50°F) | | | | | |
| 0.25 | 0.25 | 0 | Trace | 0 | 0 |
| 0.50 | 0.50 | 200 | 400 | 200 | 0 |
| 1.00 | 1.00 | 0 | 800 | 800 | 1000 |
| 1.50 | 1.50 | 0 | 400 | 1400 | 1200 |
| 1.50 | 2.00 | 0 | 400 | 1600 | 1400 |

EXAMPLE 11

Using a laboratory pug-mill type hydrator, a 20 lb. quantity of dolomitic quicklime was hydrated with 10 lbs. of 62.2% (50° baume) sulfuric acid solution. The resultant product was particulate sulfated lime comprised of a dolomitic monohydrate and calcium sulfate anhydrite, in a molar ratio of about 2.5:1. This product of hydration was screened to simulate air separation, the coarse portion being discarded. To serve as a control for this composition, a quantity of similar dolomitic quicklime was slaked with 4 lbs. water. Each of the hydration products possessed a free-water content (mechanically present water) of less than 1%.

Using the "limes" produced above, cylinders (4 inch diameter by 4.6 inches length) were prepared using the formulations noted below. The cylinders were cured in sealed containers at 100°F for 7 days. After this time, the cylinders were removed, saturated with water and tested for unconfined compressive strength. Those strengths are listed in the table below:

| Type Lime | % Lime | % Fly Ash | % Aggregate | Compressive Strength |
|---|---|---|---|---|
| Control | 3 | 10 | 87 | 561 |
| Control | 1 | 12 | 87 | 411 |
| Sulfated | 1 | 12 | 87 | 510 |

From the foregoing table it can be seen that the sulfated lime material produced a higher compressive strength cementitious material, tested at 7 days, then a similar cementitious mixture using ordinary lime at the same concentration. Moreover, this compressive strength approached that of a similar cementitious mixture with three times its lime content but without sulfate present.

EXAMPLE 12

Using the same laboratory pug mill hydrator as described in Example 11, a 20 lb. quantity of dolomitic quicklime was hydrated with 8 lbs. of a 39% sulfuric acid solution. The resultant product was particulate sulfated lime comprised of a dolomitic monohydrate and calcium sulfates in a molecular ratio of about 6:1. This product of hydration was screened to simulate air separation, the coarse portion being discarded. Again, to serve as a control for this composition, a quantity of similar dolomitic quicklime was slaked with 4 lbs. of water. Each of the hydration products possessed a free water content (mechanically present water) of less than 1%.

Again, as in Example 1, using the "Lime" produced above, cylinders 4 inches in diameter by 4.6 inches in length were prepared using the formulations noted below. Cylinders were cured in sealed containers at 100°F for 7 days. After this time cylinders were removed, saturated with water and tested for unconfined compressive strength. Those strengths are listed in the table below:

| Type Lime | % Lime | % Fly Ash | % Aggregate | Compressive Strength (psi) |
|---|---|---|---|---|
| Control | 3 | 10 | 87 | 413 |
| Sulfated | 2 | 11 | 87 | 379 |
| Sulfated | 1 | 12 | 87 | 463 |

As illustrated by the foregoing examples, the lime sulfate material used in the cementitious mixtures of the present invention may comprise various combinations of lime and sulfate compounds, including particularly the dry, particulate chemical reaction product of quicklime with water and sulfuric acid. Still another possibility within the scope of the present invention is the dry particulate product produced by the introduction into a quicklime hydration process, of a sulfate compound, such as gypsum, magnesium sulfate, etc. Although such a compound does not react to any significant extent with the quicklime, it does become intimately dispersed in the hydrated lime product and thus is readily available for the fly ash-lime-sulfate cementitious reaction.

In addition, natural pozzolans, such as certain clay minerals, volcanic glasses and calcined shales, all finely divided, may be constituted for part or all of the fly ash in the cementitious mixtures of the present invention.

Still other modifications of the present invention will be apparent to those skilled in the art. The claims appended hereto are intended to cover all such embodiments and equivalents thereof within the true scope of the present invention.

What is claimed is:

1. A method of producing a highly reactive sulfated lime product comprising
   I. contacting quicklime with
      a. sulfuric acid, the quantity of said sulfuric acid being limited so that the mole ratio of sulfuric acid to quicklime does not exceed 3.3 : 4.3, and
      b. water in an amount sufficient to hydrate that portion of the quicklime not converted to sulfate compounds by reaction with the sulfuric acid,
   II. and permitting said materials to remain in contact until reaction therebetween is substantially complete and any excess water is substantially removed by volatilization.

2. The method, as recited in claim 1, wherein the heat necessary for volatilization of said excess water is provided by the heat of reaction from said process.

3. A dry, particulate reactive sulfated lime material produced in accordance with the method of claim 1.

4. A cementitious mixture comprised of sulfated lime, as recited in claim 3, and fly ash, wherein the sulfate compound portion of said sulfated lime constitutes at least 1%, by weight, of the total of said fly ash and sulfated lime.

* * * * *